United States Patent

Heinig et al.

[11] Patent Number: 6,100,616
[45] Date of Patent: Aug. 8, 2000

[54] ELECTRIC SUBMERGIBLE MOTOR PROTECTOR

[75] Inventors: Edine M. Heinig; Marcus D. McHugh, both of Lawrence, Kans.; Raymond B. Standridge, Bartlesville, Okla.

[73] Assignee: Camco International, Inc., Houston, Tex.

[21] Appl. No.: 08/951,901

[22] Filed: Oct. 16, 1997

[51] Int. Cl.[7] .................................................. H02K 5/12
[52] U.S. Cl. ............................. 310/87; 310/89; 310/112
[58] Field of Search ................................ 310/53, 54, 87, 310/88, 157; 417/366, 367, 368, 414, 423.3, 423.8, 423.11, 423.14, 422

[56] References Cited

U.S. PATENT DOCUMENTS

| | | | |
|---|---|---|---|
| 3,571,636 | 3/1971 | Carle et al. | 310/87 |
| 3,671,786 | 6/1972 | Jones | 310/87 |
| 4,015,633 | 4/1977 | Mandell | 138/89 |
| 4,377,763 | 3/1983 | Drake | 310/87 |
| 4,558,246 | 12/1985 | Tokumitsu | 310/87 |
| 4,558,247 | 12/1985 | Yamamoto et al. | 310/87 |
| 4,788,088 | 11/1988 | Kohl | 428/34.5 |
| 4,837,068 | 6/1989 | Martin et al. | 428/133 |
| 4,940,911 | 7/1990 | Wilson | 310/87 |
| 4,974,674 | 12/1990 | Wells | 166/107 |
| 5,404,061 | 4/1995 | Parmeter | 310/87 |
| 5,554,897 | 9/1996 | Martin et al. | 310/54 |
| 5,622,222 | 4/1997 | Wilson et al. | 310/87 |

FOREIGN PATENT DOCUMENTS

| | | | |
|---|---|---|---|
| 2183613 | 9/1996 | Canada . | |
| 0 844 366 A1 | 5/1998 | European Pat. Off. | E21B 47/01 |
| 2 506 425 | 11/1982 | France | F16L 55/00 |
| 2 687 187 | 8/1993 | France | E21B 33/126 |
| 1 364 265 | 8/1974 | United Kingdom | F16J 15/34 |
| 2 085 667 | 4/1982 | United Kingdom | H02K 5/132 |

Primary Examiner—Nestor Ramirez
Assistant Examiner—Tran N Nguyen
Attorney, Agent, or Firm—Fletcher, Yoder & Van Someren

[57] ABSTRACT

An oil-filled protector for use with an electric submergible motor, comprises a housing connectable to an electric submergible motor, and an oil-filled expandable chamber within the housing and in fluidic communication with the electric submergible motor. The expandable chamber is formed from an elastomeric material, and includes materials for preventing deleterious fluids, such as H2S, CO2 and CH4, from passing through the chamber and into the motor. Such materials include elastomeric materials with one or more metallic coatings or bonded layers. The chamber can include separate annular partitions to define an inner oil-filled region and an outer region filled with a barrier fluid that substantially inhibits the passage of the deleterious fluids.

20 Claims, 4 Drawing Sheets

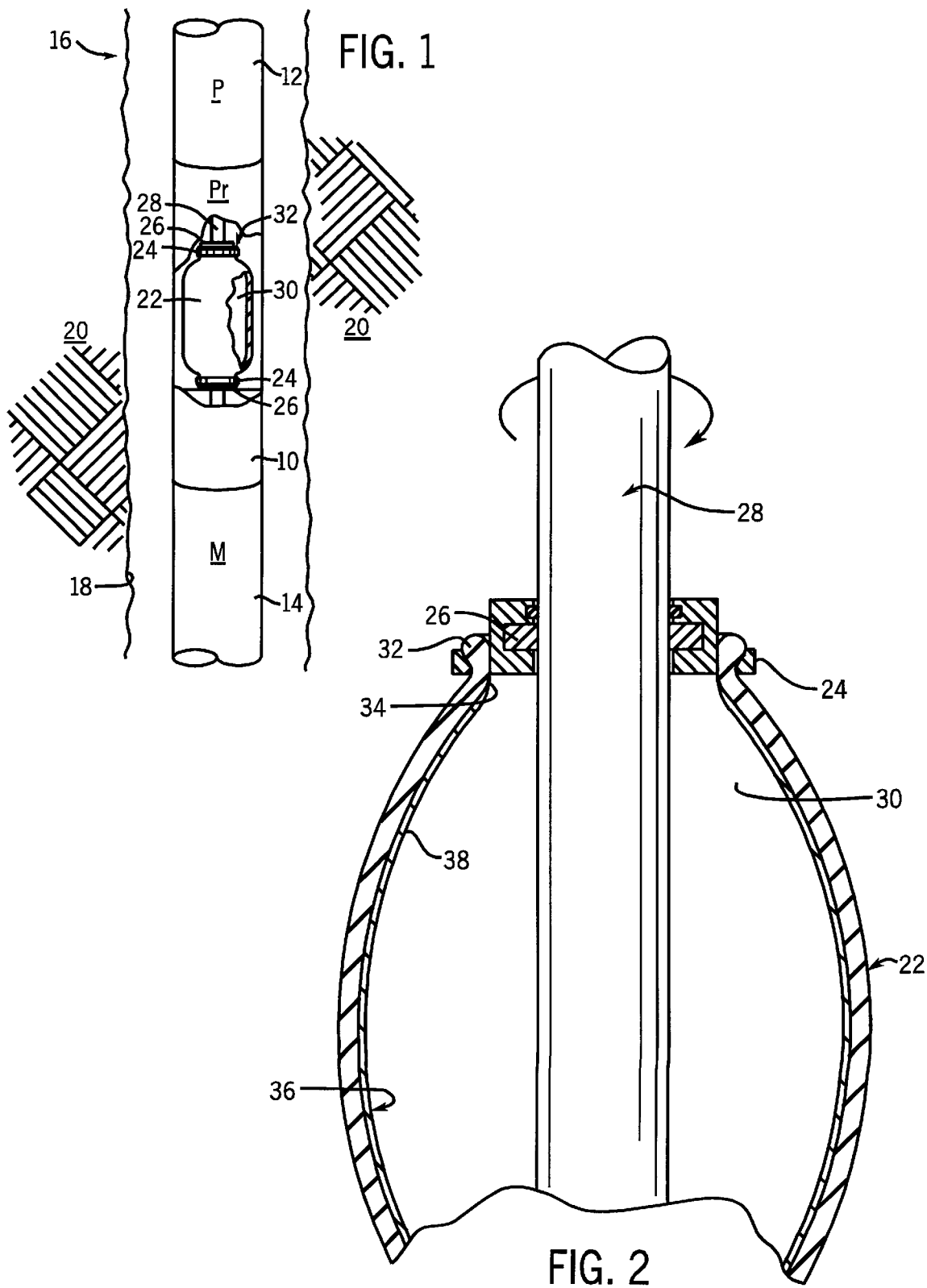

ELECTRIC SUBMERGIBLE MOTOR PROTECTOR

BACKGROUND OF THE INVENTION

1. Field of the Invention

The present invention relates to oil-filled protectors for use with submergible electric motors and, more particularly, for use with electric submergible motors to be suspended within wellbores.

2. Description of Related Art

Electric submergible pumping systems are widely used throughout the world for recovering subterranean fluids from wellbores to the earth's surface. In many wells, there are deleterious fluids that can chemically attack the materials used in the motor. For example, hydrogen sulfide will chemically attack the copper used in the motor's windings. If these deleterious fluids are not prevented from entering the motor, then the motor will prematurely fail.

For the long term successful operation of such submergible pumping systems, the electric motor must be supplied with uncontaminated cooling motor oil. This cooling oil is partially contained within one or more elastomeric bags within a motor protector. The elastomeric motor protector bags are generally cylindrical in shape and are sealed within an oil filled housing. The bags are filled with oil at the time of installation to an expanded state. With the rise of temperature caused by the immersion in the wellbore, as well as the thermal expansion caused by the operation of the electric motor, the bags tend to slightly expand even more. When the electric motor is turned off, the cooling oil cools and contracts. This contraction allows the motor protector bag to slightly deflate. The elastomer typically used for the elastomeric bags is a saturated nitrile.

A problem encountered is that several deleterious fluids can easily pass through the elastomeric bags and enter the cooling oil, and then attack the motor windings and other internal components. As used herein the term "deleterious fluids" means any liquid or gas that has a chemical reaction with or some other interaction with one or more of the internal workings of the motor that degrade the performance of the motor. Examples of such deleterious fluids are hydrogen sulfide (H2S), carbon dioxide (CO2) and methane (CH4). There is a need for a protector that has the needed elastic properties and at the same time can prevent the passage of such deleterious fluids.

SUMMARY OF THE INVENTION

The present invention has been contemplated to overcome the foregoing deficiencies and meet the above described needs. Specifically, the present invention is an oil-filled protector for use with an electric submergible motor, and it comprises a housing connectable to an electric submergible motor, and an oil-filled expandable chamber within the housing and in fluidic communication with the electric submergible motor. The expandable chamber is formed from an elastomeric material, and includes materials for preventing deleterious fluids, such as H2S, CO2 and CH4, from passing through the chamber and into the motor. Such materials include elastomeric materials with one or more metallic coatings or bonded layers. The chamber can also include separate annular partitions to define an inner oil-filled region and an outer region filled with a barrier fluid that substantially inhibits the passage of the deleterious fluids.

BRIEF DESCRIPTION OF THE DRAWINGS

FIG. 1 is a vertical partial cut-away view of an oil-filled electric motor protector, shown operationally interconnected between a pump and an electric motor, and suspended within a subterranean wellbore.

FIGS. 2–5 are vertical sectional views of alternate preferred embodiments of an elastomeric bag for use within an oil-filled electric motor protector.

DETAILED DESCRIPTION OF THE PREFERRED EMBODIMENTS

Figure 3:
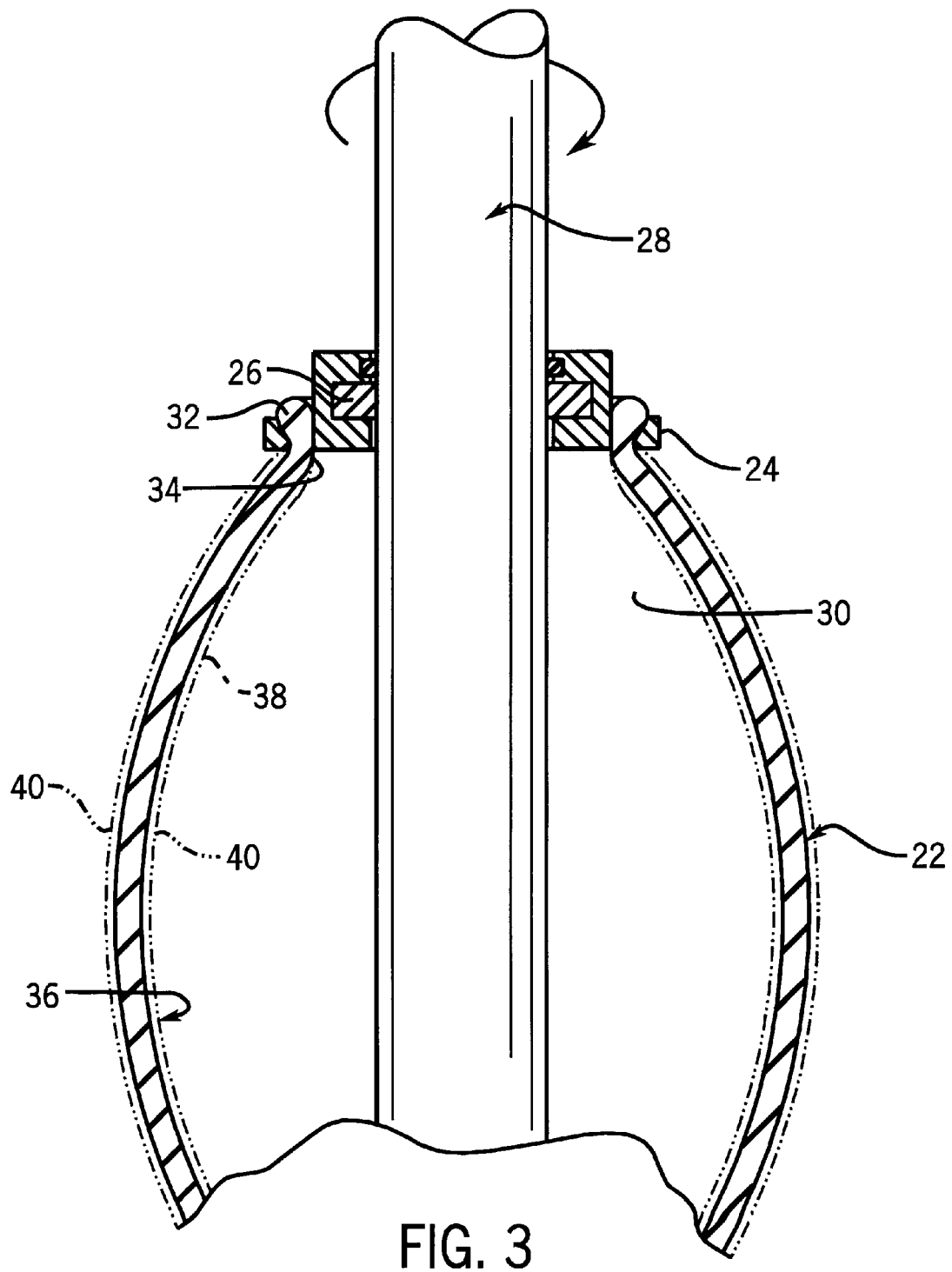

For the purposes of the following discussion it will be assumed that the elastomeric bag of the present invention is used within an oil-filled electric motor protector of the type used with submergible electric motors to be suspended within wellbores. However, it should be understood that the present invention can be used within any other type of downhole or surface motor, pump, turbine or other industrial machine that requires the use of an elastomeric body with improved resistance to the passage of deleterious fluids.

Electric motor protectors are well known to those skilled in the art, and they provide the capability for thermal expansion of the electric motor's cooling oil, they provide isolation of the cooling oil from wellbore fluids, and they usually contain thrust bearings to absorb the axial loading of the pump that is connected thereto. FIG. 1 illustrates one preferred embodiment of a motor protector 10 of the present invention connected, in any well known manner, between a pump 12 and an electric motor 14. The arrangement of the motor protector 10, the pump 12 and the electric motor 14 is commonly referred to as an electric submergible pumping system or "ESP" 16. FIG. 1 shows the ESP 16 suspended within a wellbore 18 that penetrates one or more earthen formations 20.

An interior of the motor protector 10 contains one or more generally cylindrical elastomeric bladders, chambers or "bags" 22, which are clamped on each end by annular brackets or rings 24 against spaced inner brackets and/or shaft seals 26. A shaft 28 passes through the interior of the bags 22 and connects the drive shaft (not shown) of the motor 14 to the rotor shaft (not shown) of the pump 12. An interior 30 of each bag 22 is filled with dielectric cooling oil that is conveyed to and from the electric motor 14 through internal passages (not shown) in the protector 10 and the motor 14, as is well known to those skilled in the art.

The elastomeric bag 22 is preferably formed as a single continuous body, without a seam or weld, and has a thickened portion or bead 32 adjacent each mouth or end opening 34. The bag 22 is preferably formed primarily from an elastomeric material that provides desired elasticity at wellbore temperatures. Suitable elastomeric materials include nitrile rubber, tetrafluoroethylene-propylene copolymers, vinylidene fluoride hexafluoropropylene copolymers, virtually saturated acrylonitrile-butadiene copolymers, vinylidene fluoride-perfluoromethylvinylethertetrafluoroethylene terpolymers, vinylidene fluoride hexafluoropropylene tetrafluoroethylene terpolymers, ethylene propylene diene methylene-based polymers, and combinations thereof. One or more bonded layers of such material(s) can be used as is desired.

As has been described above, deleterious fluids, such as H2S, CO2 and CH4, can readily pass through the elastomeric material under wellbore conditions, enter the cooling oil, and then chemically attack the internal components of the motor 14. Numerous attempts have been made to prevent such deleterious fluids from entering the motor 14 through the protector 10. Some of these attempts include having the shaft seals 26 and/or the bags 22 made from materials with better resistance to penetration by the deleterious fluids, and including scavenging agents in the protector, such as shown in Canadian Patent 2,183,613. The inventors hereof have found that barriers to the passage of the deleterious fluids can be included in the bags 22. Suitable barriers are preferably made from materials that are impervious to the deleterious fluids, and metallic barriers are believed to be best suited. The metals chosen are preferably non-reactive to the deleterious fluids, but combinations of layers of different materials can be used wherein one or more of the layers is reactive with one deleterious fluid but is not reactive to another. Also, relatively thick layers of slightly reactive metallic materials can be used to achieve a suitable barrier.

FIG. 2 shows one preferred embodiment of a protector 10 of the present invention wherein a fluid barrier is applied to an inner side wall surface 36 of the bag 22. In this preferred embodiment the fluid barrier comprises one or more layers of a suitable metal material that is bonded, such as by a suitable thermoset or contact adhesive, to the inner side wall surface 36. In addition, the layers can be applied to an exterior surface of the side wall of the bag 22, but at a minimum the layers need to be applied to the inner surface 36 to avoid abrasion damage. The layers preferably comprise one or more relatively thin sheets 38 of one or more suitable materials, such as aluminum, silver, zinc, gold, tin, cadmium, molybdenum, tungsten, zirconium, nickel, beryllium, iridium , lead, and combinations of these. Other metals include carbides and/or nitrides of the transition metals. Typically, these sheets 38 are from about 0.01 microns to about 0.1 microns in thickness. These sheets 38 need to have some ability to stretch without cracking because of the bags 22 expanding and deflating during operation; therefore, metal coated polymer materials, such as metal vapor coated polyethylene sheets, can be used.

FIG. 3 shows an alternate preferred embodiment the one or more layers 38 comprise one or more relatively thin layers 40 of metallic material vapor deposited or coated directly onto the inner surface 36 of the side wall of the bag 22 and/or the exterior surface thereof. The process of depositing or coating metals onto an elastomeric material are well known to those skilled in the art. For example, reference can be made to U.S. Pat. No. 4,837,068. The thickness of the layer(s) 40 is preferably from about 0.01 microns to about 0.05 microns. As before, the layer(s) 40 is formed from one or more suitable materials, such as aluminum, silver, zinc, gold, tin, cadmium, molybdenum, tungsten, zirconium, nickel, beryllium, iridium, lead, and combinations of these. Other metals include carbides and/or nitrides of the transition metals.

Figure 4:
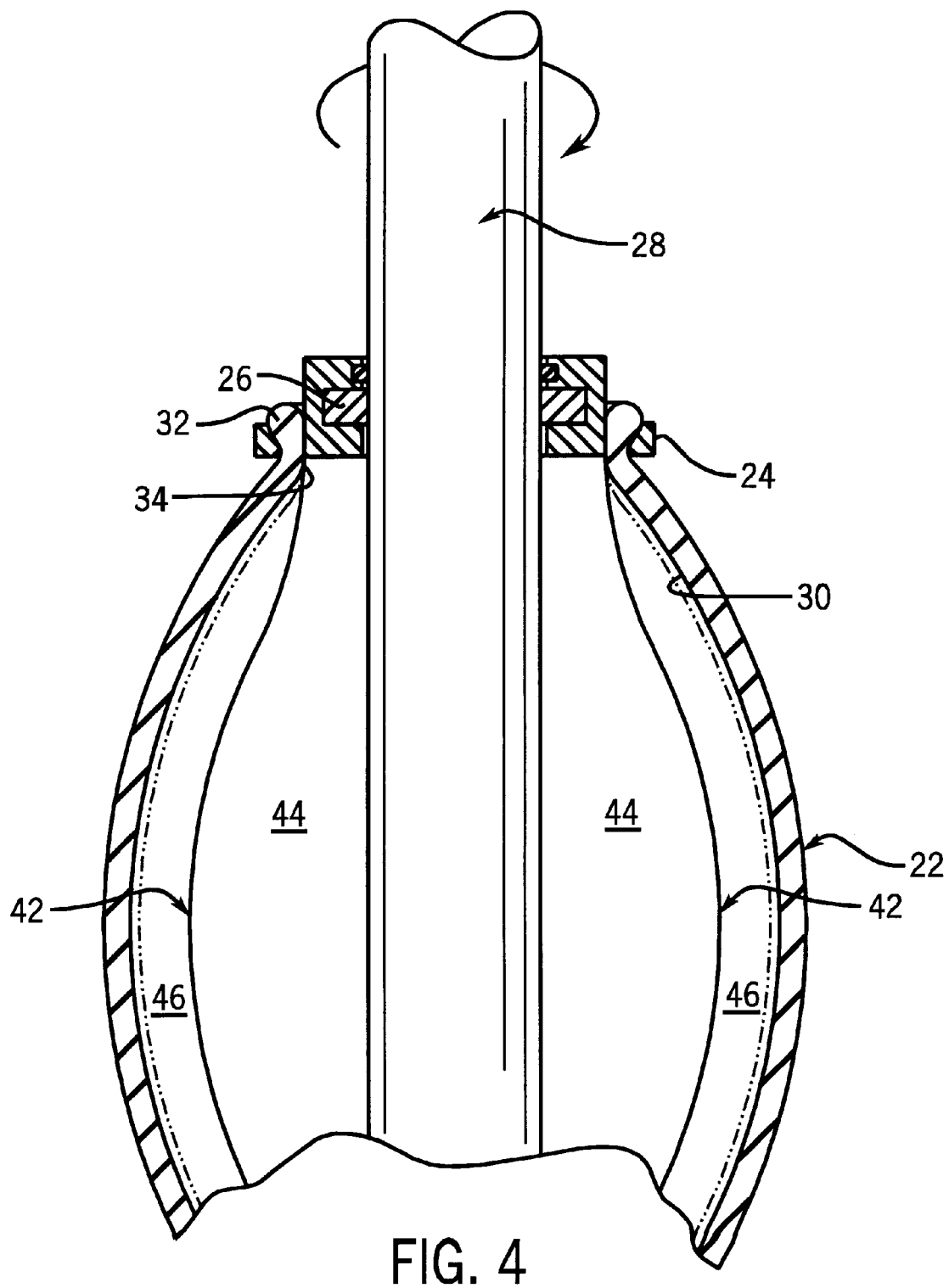

FIG. 4 shows an alternate preferred embodiment wherein one or more annular partitions 42 are included within the bags 22 to create at least an inner region 44 and at least one outer region 46 within the bags 22. The partitions 42 preferably take the form of separate annular bags that are concentrically aligned within the bags 22 about the shaft 28. The partitions 42 can be formed from the same material as the bag 22 or from separate materials.

In one preferred embodiment a partition 42 is formed from the same material as the bag 22, and includes fluidic barrier sheets and/or coatings on its inner and/or outer surfaces in any of the manners described above in relation to FIGS. 2 and 3. In an alternate preferred embodiment, the partition 42 is formed from a metal coated polymeric material, such as aluminum or silver vapor coated polyethylene. This partition 42 is made slightly longer longitudinally than needed so that as the volume of the cooling oil increases during operation of the motor 14, the shape of the partition 42 will change to become more uniform and rigid. In this manner, the stress of expansion on the polymeric material will be reduced and thus the chances of cracking the metallic barrier will be reduced.

Figure 5:
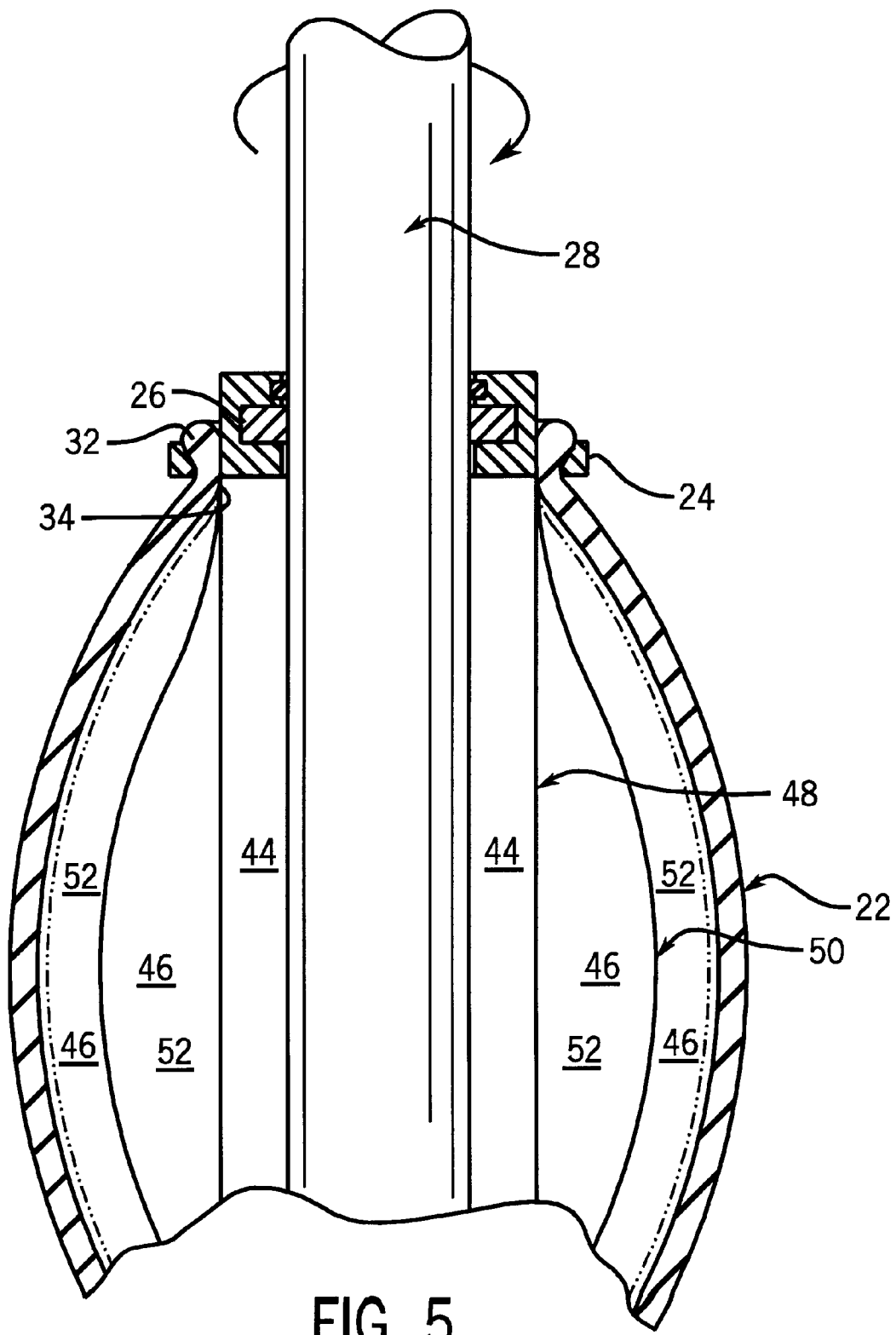

An alternate preferred embodiment is shown in FIG. 5 wherein more than one partition 42 is used, with an inner partition 48 and an outer partition 50. The partitions 48 and 50 can be made from the same or similar materials to one another, or they can be made from separate materials. In addition, the fluidic barriers used on the bag 22 and the partitions 48 and 50 can be different to provide differing and/or redundant layers of protection against the deleterious fluids entering the cooling oil and then into the motor 14.

In one preferred embodiment of the types shown in FIGS. 4 and 5, the inner region 44 and the outer region 46 are both filled with the same dielectric cooling oil. However, in one preferred embodiment, the outer region 46 is filled with a barrier fluid 52 that resists the passage of one or more of the deleterious fluids there through. Examples of such barrier fluids 52 are gels, foams, or liquids of relatively high viscosity, and/or with suspended particles of hydrogen sulfide scavenging agents. Such scavenging agents include zinc, iron, copper, silver, zinc oxide, and the like, as are well known to those skilled in the art.

Whereas the present invention has been described in particular relation to the drawings attached hereto, it should be understood that other and further modifications, apart from those shown or suggested herein, may be made within the scope and spirit of the present invention.

What is claimed is:

1. A motor protector for use in an electric submergible pumping system, comprising:
    a motor protector housing connectable to an electric submergible motor; and
    an expandable member within the motor protector housing, the expandable member having a liquid-filled interior chamber in fluid communication with the electric submergible motor, wherein the expandable member comprises an elastomeric layer and a deleterious fluid barrier disposed adjacent the elastomeric layer.

2. The motor protector as recited in claim 1 wherein the deleterious fluid barrier comprises a metallic material.

3. The motor protector as recited in claim 2 wherein the metallic material is bonded to the elastomeric layer.

4. The motor protector as recited in claim 1 wherein the deleterious fluid barrier comprises a fluid filled annular chamber.

5. The motor protector as recited in claim 1 wherein the expandable member comprises a flexible partition disposed radially inward from the elastomeric layer.

6. An oil-filled protector for use with an electric submergible motor, comprising:
    a motor protector housing connectable to an electric submergible motor;
    an oil-filled expandable chamber within the motor protector housing and in fluidic communication with the electric submergible motor; and
    the oil-filled expandable chamber being formed from an elastomeric material and including means for preventing deleterious fluids from passing through the oil-filled expandable chamber.

7. An oil-filled protector of claim 6 wherein the elastomeric material is selected from the group consisting of: nitrile rubber, tetrafluoroethylene-propylene copolymer, vinylidene fluoride hexafluoropropylene copolymer, virtually saturated acrylonitrile-butadiene copolymer, vinylidene fluoride-perfluoromethylvinylether-tetrafluoroethylene terpolymer, vinylidene fluoride hexafluoropropylene tetrafluoroethylene terpolymer, ethylene propylene diene methylene-based polymers, and combinations thereof.

8. An oil-filled protector of claim 6 wherein the preventing means further comprises at least one layer of metallic material bonded to a side wall of the chamber.

9. An oil-filled protector of claim 8 wherein the metallic material is bonded to an inner surface of the side wall of the chamber.

10. An oil-filled protector of claim 9 wherein the metallic material is glued to an inner surface of the side wall of the chamber.

11. An oil-filled protector of claim 8 wherein the metallic material is selected from the group consisting of aluminum, silver, zinc, gold, tin, cadmium, molybdenum, tungsten, zirconium, nickel, beryllium, iridium, lead, and combinations of these.

12. An oil-filled protector of claim 6 wherein the preventing means further comprises at least one coating of a metallic material applied to a side wall of the chamber.

13. An oil-filled protector of claim 12 wherein the coating of the metallic material is applied to an inner surface of the side wall of the chamber.

14. An oil-filled protector of claim 1 wherein the preventing means further comprises one or more annular partitions within the expandable chamber, wherein at least one of the partitions is made from a material different from the expandable chamber.

15. An oil-filled protector of claim 6 wherein the preventing means further comprises one or more annular partitions within the chamber to define an inner oil-filled region and a separate outer region.

16. An oil-filled protector of claim 15 wherein at least one of the annular partitions comprises a metallic material that prevents the passage of deleterious fluids there through.

17. An oil-filled protector of claim 15 wherein a metallic material is bonded to a side wall of at least one of the annular partitions.

18. An oil-filled protector of claim 15 wherein at least one coating of a metallic material is applied to a side wall of at least one of the annular partitions.

19. An oil-filled protector of claim 15 wherein at least one of the annular partitions comprises a polymeric material with at least one layer of a metallic coating.

20. An oil-filled protector of claim 19 wherein the separate outer region is filled with a fluid.

* * * * *